United States Patent
Molas Carol et al.

(10) Patent No.: US 12,148,026 B2
(45) Date of Patent: Nov. 19, 2024

(54) COMPUTER-IMPLEMENTED METHOD, SYSTEM AND COMPUTER PROGRAM PRODUCTS FOR CONTROL AND ALLOCATION OF ACCESS RIGHTS WITH VARIABLE PRICE

(71) Applicant: MOZION SOLUTIONS, S. L., Barcelona (ES)

(72) Inventors: Marc Molas Carol, Barcelona (ES); Rafael Gimeno-Bayón Del Molino, Barcelona (ES); Xavi Manresa Xarau, Barcelona (ES); Alvaro Querol Gras, Barcelona (ES)

(73) Assignee: MOZION SOLUTIONS, S. L., Barcelona (ES)

( * ) Notice: Subject to any disclaimer, the term of this patent is extended or adjusted under 35 U.S.C. 154(b) by 853 days.

(21) Appl. No.: 17/257,630

(22) PCT Filed: Nov. 20, 2019

(86) PCT No.: PCT/IB2019/059971
§ 371 (c)(1),
(2) Date: Jan. 4, 2021

(65) Prior Publication Data
US 2021/0272189 A1    Sep. 2, 2021

(30) Foreign Application Priority Data
Nov. 29, 2018   (EP) .................... 18382864

(51) Int. Cl.
*G06Q 30/00* (2023.01)
*G06Q 10/02* (2012.01)
(Continued)

(52) U.S. Cl.
CPC ............. *G06Q 30/08* (2013.01); *G06Q 10/02* (2013.01); *G06Q 30/0283* (2013.01)

(58) Field of Classification Search
CPC ..... G06Q 30/0601–0645; G06Q 30/08; G06Q 10/02; G06Q 30/0283
(Continued)

(56) References Cited

U.S. PATENT DOCUMENTS 6,907,405 B2   6/2005   Brett
7,747,507 B2   6/2010   Brett
(Continued)

FOREIGN PATENT DOCUMENTS

EP            2188733 A2        5/2010

OTHER PUBLICATIONS

Ligaya, Armina, Looking for the cheap seats: 8 ways to get a deal on concert tickets, Nov. 14, 2019, CTV News, accessed at [https://www.ctvnews.ca/entertainment/looking-for-the-cheap-seats-8-ways-to-get-a-deal-on-concert-tickets-1.4685911?cache=%3Fclipld%3D68596] (Year: 2019).*

(Continued)

*Primary Examiner* — Michael Misiaszek
*Assistant Examiner* — Lindsey B Smith
(74) *Attorney, Agent, or Firm* — Maier & Maier, PLLC

(57) ABSTRACT

A method, system and computer program for control and allocation of access rights with variable price are provided. The method provides a first offer for a section of a site, including information on the number of places available, a recommended price and a period in which the offer is valid; receives proposals with different prices in relation to the first offer; verifies that the received proposals are greater or equal to a minimum price and applies a criterion of allocation of places to the received proposals meeting this condition or closes the first offer; provides a second offer for said section, including information about the number of places remaining, a recommended price, the average closing price of the first offer and a period for which the offer is valid. Some (Continued)

steps can be repeated for the second offer and so on consecutively until the places are sold-out.

18 Claims, 2 Drawing Sheets

(51) Int. Cl.
  *G06Q 30/0283* (2023.01)
  *G06Q 30/08* (2012.01)
(58) Field of Classification Search
  USPC .............................................. 705/26.1–27.2
  See application file for complete search history.

(56) References Cited

U.S. PATENT DOCUMENTS

| | | | |
|---|---|---|---|
| 7,769,673 | B2 | 8/2010 | Brett |
| 8,015,073 | B2 | 9/2011 | Ilechko et al. |
| 8,073,765 | B2 | 12/2011 | Brett |
| 8,538,856 | B2 | 9/2013 | Brett |
| 9,614,733 | B1 | 4/2017 | Sussman et al. |
| 10,515,403 | B1* | 12/2019 | Allen ................ G06Q 30/08 |
| 2008/0077505 | A1* | 3/2008 | Ilechko ............. G06Q 10/02 |
| | | | 705/5 |
| 2009/0276364 | A1 | 11/2009 | Iaia et al. |
| 2014/0330619 | A1* | 11/2014 | Hatanian .......... G06Q 30/0206 |
| | | | 705/7.35 |
| 2015/0170062 | A1* | 6/2015 | Harada ............. G06Q 10/02 |
| | | | 705/5 |
| 2015/0242763 | A1* | 8/2015 | Zamer .............. G06T 11/60 |
| | | | 705/5 |
| 2016/0125521 | A1* | 5/2016 | Randel ............. G06F 16/9535 |
| | | | 705/26.3 |
| 2016/0283699 | A1* | 9/2016 | Levin .............. G06F 21/44 |
| 2017/0046635 | A1* | 2/2017 | Thomas ........... G06Q 30/0601 |
| 2018/0158000 | A1* | 6/2018 | Fredette ........... G06Q 10/02 |
| 2019/0279280 | A1* | 9/2019 | Paar ................ G06T 11/206 |

OTHER PUBLICATIONS

Yap, Jacky, Peatix announces patent pending ColorSync, the QR Code killer, Dec. 19, 2013, yahoo News, accessed at [https://sg.news.yahoo.com/peatix-announces-patent-pending-colorsync-qr-code-killer-032103710.html] (Year: 2013).*

International Search Report and Written Opinion of the International Searching Authority issued on Jan. 28, 2020 in corresponding International application No. PCT/IB2019/059971; 12 pages.

"Public-key cryptography—Wikipedia, the free encyclopedia", 2015; URL: https://en.wikipedia.org/w/index.php?t, retrieved in 2016; 9 pages.

* cited by examiner

COMPUTER-IMPLEMENTED METHOD, SYSTEM AND COMPUTER PROGRAM PRODUCTS FOR CONTROL AND ALLOCATION OF ACCESS RIGHTS WITH VARIABLE PRICE

FIELD

The present invention relates in general to networked systems to operate transactions through computing devices. More in particular, the invention relates to a computer-implemented method, a system and computer programs for control and allocation, more efficiently and with higher profits for all agents/subjects involved (buyer and seller), of access rights with variable price, for example tickets for an event, hotel rooms, tickets for modes of transport, etc.

BACKGROUND

In the state of the art, multiple methodologies for the automatic sale of access rights are known, in particular tickets for an event, for example a concert or a sporting event.

For example, Patent Application EP2188733A2 discloses computer-controlled resource allocation methods and systems in a networked system. In one example, a computer system receives a plurality of requests to select one or more resources of distributed computer systems throughout a network. The computer system allocates time windows to at least a part of the received requests based on one or more allocation criteria, and transmits information relating the time windows to the corresponding requesting computer systems.

U.S. Pat. No. 8,015,073B2 describes a configurable contracting service for events with limited capacity for which tickets are sold. In this invention, multiple lots of tickets can be released sequentially in time. Some of the lots can be auctioned. In addition, a dynamic pricing system can be implemented per lot based on the relative market value of the tickets, which can be determined in part from the auction data previously captured. The auction data may include, among others, the price of the offer, the volume of the offer, the diversity of bidders, the quantity of tickets per offer and the frequency of the offers. The parameters of the auction and the prices of the tickets may vary over time according to the risks of the vendor and the costs, which may change dynamically as tickets are sold for an event and as the time of the event approaches.

U.S. Pat. No. 9,614,733B1 discloses methods and systems for reducing the use of a networked computer system. According to this invention, users can request, within a time window, resources through a computer network before the resources are available. Then, resources can be allocated in lots when resources are available. Therefore, requests do not have to be processed in real time, and can be received before resources are available.

Other known strategies in the field of selling tickets are disclosed in documents U.S. Pat. Nos. 6,907,405B2, 7,747,507B2, 7,769,673B2, 8,073,765B2 and 8,538,856B2.

SUMMARY

The present invention provides, according to a first aspect, a computer-implemented method for the automatic allocation and control of access rights with a variable price, for example tickets for an event (concert, theater, sports event, etc.), hotel rooms/hostel, air or train tickets, among others.

The proposed method comprises using a control computing device (control server, PC, laptop, tablet, mobile phone, etc.) which includes or has access to a database with information associated with a site comprising one or more sections. Additionally, each of the sections includes a certain number of places.

Unlike the proposals known in the field, the proposed method comprises a) providing, by said control computing device, to a bidirectional interface accessible by potential users through computing terminals, for example a mobile phone or a computer, among others, on a first date, a first offer for a first section of said site. According to the proposed method, the first offer includes information about a number of places available for the first section, for said first offer, a recommended price, and a period of time in which the first offer is valid. Then, the method comprises b) receiving, by the control computing device, through said interface, of said computing terminals of the potential users, and during the aforementioned period of time, a certain number of proposals with different prices in relation with said first offer. Next, the control computing device c) verifies that the proposals received meet the condition of being greater than or equal to a certain minimum price.

To those proposals received that meet the aforementioned condition, the control computing device applies a criterion for the allocation of places, while indicating, through said interface, to the potential users whose proposal does not meet the condition that the same is not acceptable, but that they can send another proposal. In the event that the number of proposals received that meet the aforementioned condition reaches the number of places of the first offer, or exceeds it, the latter is closed.

Once the period of the first offer has ended, the method comprises d) providing, by the control computing device, on a second date, different from the first date, a second offer for the first section, including information about the number of remaining places available for the first section, in this second offer, a recommended price, the average closing price of the first offer and a period of time in which the second offer is valid, and e) repeating steps b) and c) for this second offer and in case there are still available places in the first section to continue providing other consecutive offers on other dates, for the first section, performing steps b) and c) until the number of places for the first section is sold-out.

In the proposed method, the recommended price of the different offers may be different. Also, the places offered in the first offer are less than the total capacity of the site and particularly of the first section. For example, the places offered in the first offer may be 25% of the total places in the aforementioned section. In another example, the offered places can be 35-40% of the total places of the section, among other possible examples.

With the proposed method, the final price assigned to each potential user reflects a variable maximum price that potential users are willing to propose for the aforementioned event, hotel/hostel room, plane ticket, etc. That is, the present invention allows to discover the price that each user is honestly willing to pay for a place.

In this way, the present invention avoids price manipulation and/or resale of such access rights, by implementing the whole process through a closed system.

According to the proposed method, the number of places offered in each offer may be the same or may be different.

In a particular embodiment, the proposed method is used for the allocation of tickets for a certain event, for example a concert. In this case the site refers to a stadium, party room or even a theater, with a certain capacity. The invention allows to solve some of the numerous problems that coexist in the organization of this type of events, i.e. to obtain an optimum capacity and an optimal profitability (maximization of benefits according to the programmed event), giving priority to the allocation of the maximum number of tickets, with the highest possible profitability for the promoter and the most advantageous price for the attendee/user and for groups of attendees/users (such as fan groups), prioritizing the social function of the event, maximizing the economic performance of the promoter and, therefore, of the artist. Likewise, the present invention integrates in its behavior the possibility of acting as an automated system for the upwards allocation of tickets in cases of full capacity.

In another embodiment, the proposed method is used for the allocation of rooms in a hotel/hostel. In this case, the site refers to the hotel/hostel itself, the sections refer to the different rooms and places to the number of beds available in each room. In case the method is used for the allocation of transportation tickets, for example airplane or train tickets, the site would refer to the airplane/train, the sections to the different classes (first class, tourist with restrictions, tourist without restrictions, etc.) and the places to the number of tickets/places available for each class.

In an exemplary embodiment, steps a) to c) are carried out for several sections. In this case, each of these sections may have a different minimum price.

In an embodiment, if the number of proposals received that meet the condition exceeds the number of places in the first offer, for example the number of places offered is 100 and 150 proposals that meet the condition are received, the algorithm in the control computing device automatically expands the number of places in the first section to accommodate the total number of proposals received that meet the condition. This extension/expansion can be done in time or in space. In the first case, said extension is carried out gradually as the proposals are received, that is to say, the control computing device takes into consideration a reception rate of the proposals to carry out said extension. The extension of the places (for the 50 proposals that do not fit in the first offer) can be done by taking more places from the first section, if there is still availability, or by taking places from another section. In the second case, said extension is carried out only by expanding the number of places in the first section to accommodate the total number of proposals received that meet the condition and if the first section has no more availability, the proposals are assigned to a second section.

In an embodiment, the first section is divided into a certain number of blocks, where each block has assigned a number of places. In this particular embodiment, the method comprises:

a) providing, by the control computing device, via the bidirectional interface, on a first date, a first offer for a first block, including information about a number of places available for the first block, for the first offer, a recommended price, and a period of time in which the first offer for the first block is valid;

b) receiving, by the control computing device, through the interface, from the computing terminals of the potential users, and during said period of time, a certain number of proposals with different prices in relation to the first offer for the first block;

c) verifying, by the control computing device, that the proposals received meet the condition of being greater than or equal to a certain minimum price and:
applying a criterion of allocation of places to those received proposals that meet said condition, and indicating, through the interface, to the computer terminals of potential users whose proposal does not meet said condition that the same is not acceptable, but that they can send another proposal for the first block if it is not closed or for another block;
in the event that the number of proposals received that meet the condition exceeds the number of places in the first offer, the control computing device automatically expands the number of places in the first block until it houses/accommodates the total number of proposals received that meet the condition, wherein said expansion is carried out gradually taking into consideration a proposal reception rate, or if the first block has no more capacity (i.e. does not have more availability) by allocating the proposals to at least a second block, wherein the first block is closed if the number of proposals received that meet the condition reaches, or exceeds, their number of places;

d) providing, at the end of the period of the first offer, by the control computing device, on a second date, at least a second offer for the first block (if it is not closed) or for at least a second block, including information about the number of places, in this second offer, a recommended price, the average closing price of the first offer and a period of time in which the second offer is valid; and e) repeating steps b) and c) for the second offer, and for the rest of the blocks.

So the proposed method makes a dynamic modification of the capacity of the blocks according to the received proposals.

In an embodiment, the criterion of allocation of places in step c1) is carried out according to a priority range as per the reception order of the different proposals. In another example, the criterion of allocation of places is made according to a priority range depending on the proposals that have a higher value. In another example, the criterion of allocation of places is made according to a priority criterion to those proposals that are above an average value within all the proposals received. In yet another example, the criterion of allocation of places is assigned to a certain number of places at a price that exceeds the minimum price of the offer by a fixed amount. In yet another exemplary embodiment, the criterion of seat allocation is carried out giving priority to those proposals that are made in larger groups as opposed to those in smaller groups or one single seat.

In an exemplary embodiment, the proposals received from each of the potential users are encrypted, including, each proposal, a unique user identifier with a private key and a public key.

In an embodiment, the method in step c) further comprises verifying that the proposals received are greater than a minimum price threshold and/or less than a maximum price threshold. If the proposals are below the minimum price threshold, an appreciation is applied, that is, the proposal is automatically increased by a certain percentage. If the proposals exceed the maximum price threshold, a depreciation is applied, that is, the proposal is automatically reduced by a certain percentage. With this control factor, fluctuations or instabilities in the general value of access rights or goods are avoided.

The proposed method can also be used for automated allocation of goods with a variable price, for example for the allocation of multiple identical products, for example a limited edition of a pair of shoes, a bag, luxury accessories, a technological gadget, etc. Thus, in yet another embodiment, the method comprises: a) providing, by said control computing device, to potential users through the computing terminals, on a first date, a first offer for said goods, including information about a number of units available in said first offer, a recommended price, and a period of time in which said first offer is valid, wherein the number of units offered in the first offer is less than the total amount of goods; b) receiving, by the control computing device, from the computing terminals of the potential users, and during the aforementioned period of time, a certain number of proposals with different prices in relation to the first offer; c) verifying, by the control computing device, that the proposals received meet the condition of being greater than or equal to a certain minimum price and c1) applying a criterion of allocation of goods to those proposals received that meet said condition, and indicate, through said interface, to said computing terminals of potential users whose proposal does not meet said condition, that the same is not acceptable, but that they can send another proposal; or c2) in the event that the number of proposals received that meet this condition reaches or exceeds the total amount of goods of said first offer, the latter is closed.

Additionally, the method also comprises d) providing, at the end of the period of the first offer, by the control computing device, on a second date, at least a second offer for said goods, including information about the number of units that there are available in this second offer, a recommended price, the average closing price of the first offer and a period of time in which said second offer is valid; and e) repeating steps b) and c) for said second offer and in the event that there are still available goods, continue to provide other consecutive offers on other dates, until the total quantity of goods is sold-out.

Other embodiments of the invention disclosed herein also include a system and computer program products for performing the steps and operations of the method proposed in the first aspect of the invention. More particularly, a computer program product is an embodiment having a computer-readable means that includes computer program instructions encoded therein which, when executed in at least one processor of a computer system, produce the processor to perform the operations indicated in the present document as embodiments of the invention.

BRIEF DESCRIPTION OF THE DRAWINGS

The foregoing and other features and advantages will be more fully understood from the following detailed description of some exemplary embodiments, merely illustrative and not limiting, with reference to the accompanying drawings, in which.

DETAILED DESCRIPTION OF THE EMBODIMENTS

Figure 1:
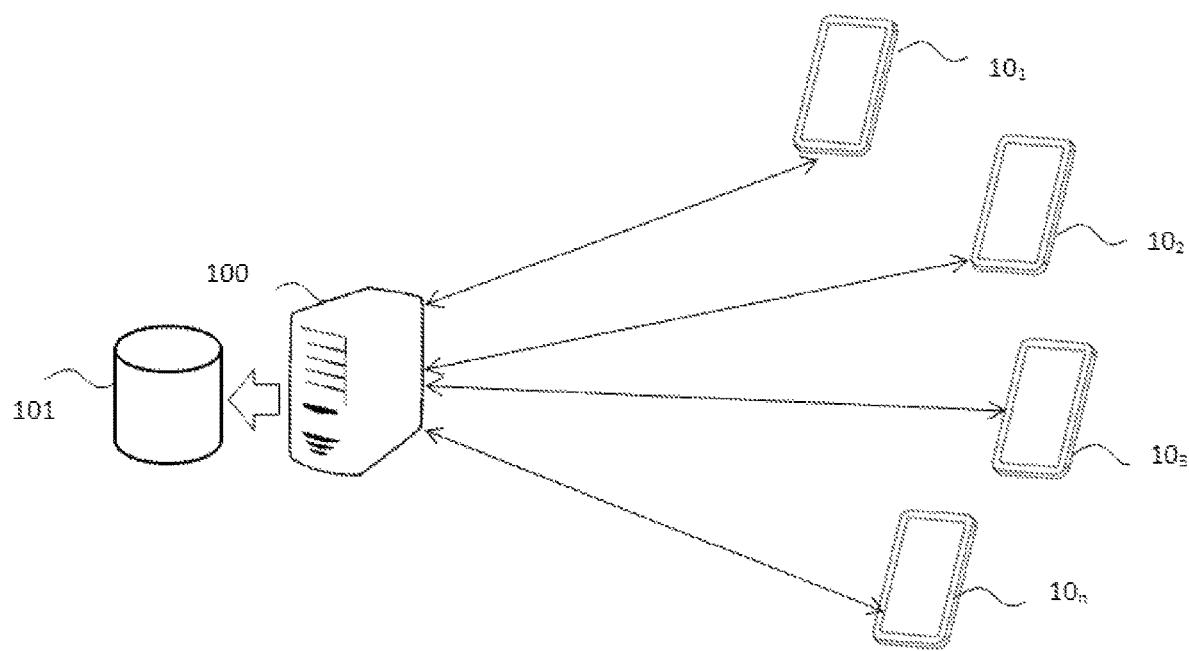
FIG. 1 schematically shows the architecture of the proposed system for the control and allocation of access rights with a variable price.

FIG. 1 shows an embodiment of the architecture of the proposed system. As seen in the figure, the system comprises a control computing device 100, which includes one or more processors and at least one memory, for example a server, a PC, a laptop, etc. which has access to a database 101. In other exemplary embodiments, in this case not illustrated, the control computing device 100 could include said database 101.

The database 101 includes information associated with a site, for example a stadium where a multitudinous event is to be held, for example a concert. Likewise, the site comprises one or several sections, each of them with a determined number of places and each one also being able to include a plurality of places. It should be noted that the present invention is not limited to any particular type of site. In fact, the invention can be used to allocate any type of access right with a variable price, including tickets for concerts or sporting events, tickets for modes of transport, rooms in hotels/hostels, etc.

In FIG. 1 the different computing terminals $10_1$, $10_2$, $10_3$ ... $10_n$ of the potential users/attendees to the site have also been illustrated. The communication between the control computing device 100 and the different computing terminals $10_1$, $10_2$, $10_3$ ... $10_n$ is carried out through a communication interface or bidirectional communication network.

Figure 2:
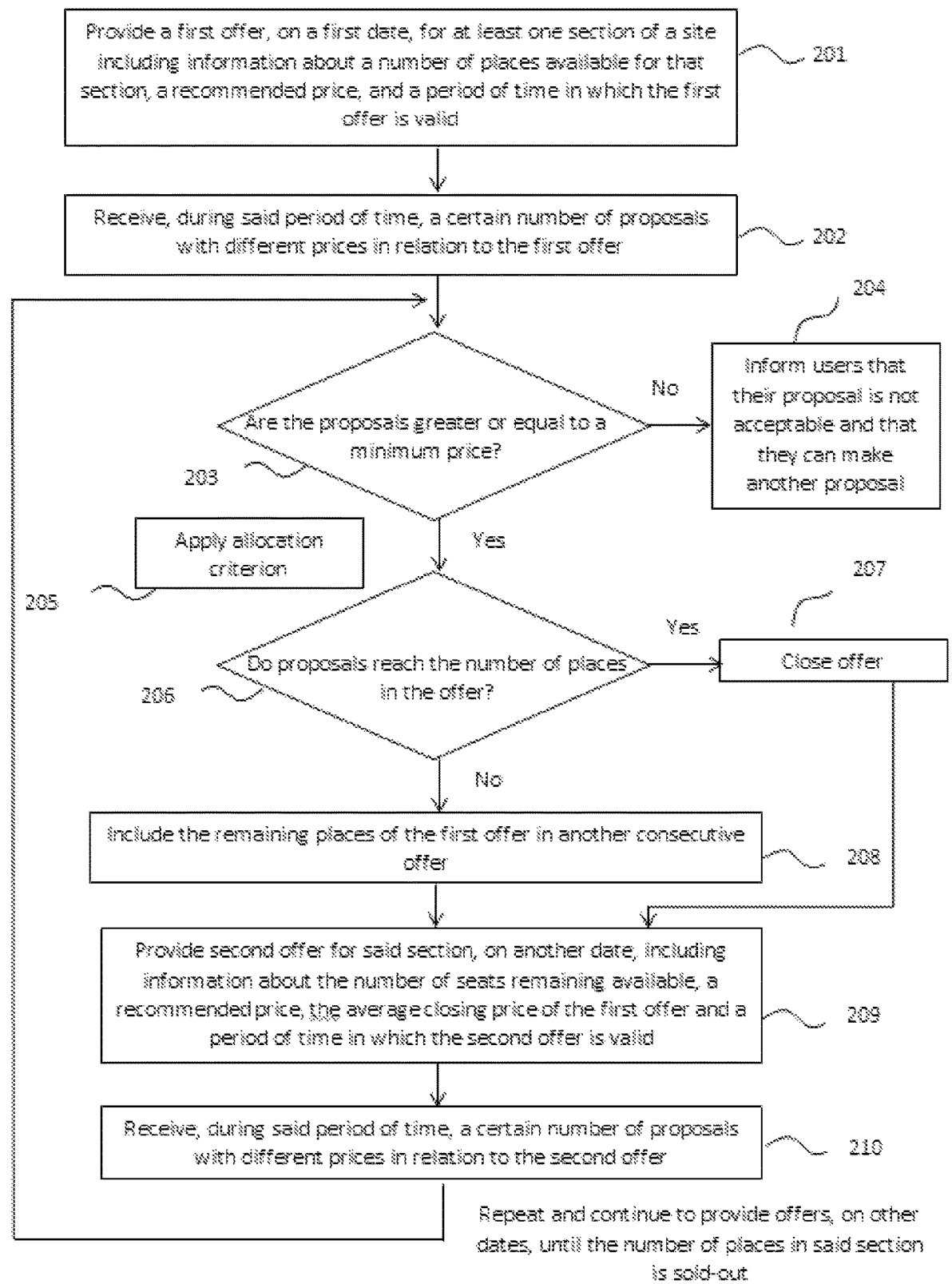
FIG. 2 shows a flow chart of an implementation of the method of the present invention according to an exemplary embodiment.

Referring now to FIG. 2, there is shown an embodiment of a method for the control and allocation of access rights with a variable price, in this particular example, for assigning tickets for a multitudinous event. The control computing device 100 executes or performs all the steps described in FIG. 2. This process described in FIG. 2 allows discovering the price that each user/attendee is willing to pay for a place to attend said event.

In step 201 of FIG. 2, the control computing device 100 provides a first offer, on a first date, for at least a first section of a site where the event is to be held. The first offer includes: information about the number of places available for said first section, for said first offer, a recommended price, and a period of time in which the first offer is valid. In step 202, the control computing device 100 receives from the computing terminals $10_1$, $10_2$, $10_3$ ... $10_n$, and during the aforementioned period of time in which the first offer is active, a certain number of proposals with different prices in relation to the first offer. In step 203 the control computing device 100 checks whether the received proposals are greater than or equal to a certain minimum price, for example by the event promoter. The minimum price is kept secret for potential users/attendees.

To the received proposals that meet the aforementioned condition, i.e. the proposals that are greater than or equal to the minimum price determined, a criterion for the allocation of places is applied (step 205). On the contrary, the control computing device 100 indicates or notifies the computing terminals $10_1$, $10_2$, $10_3$ ... $10_n$ of the potential users/attendees whose received proposals do not meet the aforementioned condition, for example by means of an APP installed in said terminals, that their proposal is not acceptable but that they can make another proposal. Each user/attendee will be able to know at any time, through said APP, the status of their proposal, that is, whether it has been accepted or not.

The allocation of places can be done taking into account different criteria. For example, the control computing device 100 can prioritize the proposals in the order of reception, that is, any proposal that exceeds the minimum price is automatically accepted. This does not imply a different behavior of the system, which always waits for the closing of the offer to calculate all the allocations. In another example, the control computing device 100 can give priority to proposals that have a higher value and allocate the places in descending order in relation to the highest proposal. In another example, the control computing device 100 can give priority to proposals that are above an average value of all received proposals. In yet another example, the control computing device 100 can perform the allocation of a certain number of places at a price that exceeds the minimum price of the offer by a predetermined amount. In yet another example, proposals made in group (meaning groups of access rights) receive priority over single proposals.

Returning to the explanation of FIG. 2, in step 206, the control computing device 100 verifies whether the number of proposals received that meet said condition reaches the maximum number of places of the first offer. If affirmative, the first offer is closed (step 207). On the contrary, if there are still available places, these are included in a second offer that will be made on a second date, different from the first (step 208). That is, the different offers are not contemporary but consecutive, on different dates, for example on different days.

In step 209, the control computing device 100 provides the second offer for said first section including information about the number of remaining places available for the first section, a recommended price for this second offer (which may be the same or different from recommended price of the first offer), the average closing price of the first offer and a period of time in which said second offer is valid. In step 210, the control computing device 100 receives from the computing terminals $10_1$, $10_2$, $10_3$ ... $10_n$, and during the aforementioned period of time in which the second offer is active, a certain number of proposals with different prices in relation to the second offer. Next, the control computing device 100 will verify again (step 203) if the proposals received for this second offer are greater than or equal to the determined minimum price, repeating the previously described steps until there are no available places for the first section or until that the event takes place.

It should be noted that in step 201, the control computing device 100, in another embodiment, can provide, in parallel or at the same time, a first offer for each of the sections of the site where the event will take place. In this case, each section may have a different minimum price. The control computing device 100 will receive the different proposals, for each of the different sections, and will verify that they meet the condition of being greater, or equal, to the minimum price of each section, informing or notifying each potential user of the status of their proposal.

In another exemplary embodiment, in this case not illustrated, the first section is divided into a number of blocks, each block having a certain number of places assigned. The control computing device 100 receives the proposals of the potential users/assistants. Preferably, in this case, the proposals received follow the following pattern: user, blockid, date of the proposal and value of the proposal.

At closing date of the first offer, and therefore of the first block, the control computing device 100 verifies that the proposals received meet the condition of being greater than or equal to a certain minimum price. As was the case in the example explained in FIG. 2, to the proposals received that meet the aforementioned condition, a criterion for assigning places is applied. On the contrary, the control computing device 100 indicates or notifies the computing terminals $10_1$, $10_2$, $10_3$ ... $10_n$ of the potential users/assistants whose proposals received do not meet the condition, for example by means of said APP, that their proposal is rejected but that they can make another proposal, for the first block (if it is not closed yet) or for another block (when the corresponding offer will be opened). It should be noted that each user/assistant can know at any time, through the APP, the status of their proposal, that is, whether it has been accepted or not.

If the number of proposals received that meet the condition exceeds the number of places in the first block, the control computing device 100 can automatically expand the number of places in the first block. This extension in an embodiment is carried out gradually taking into consideration a rate at which proposals are received. If the first block has no more capacity for places, the proposals will be assigned to a second block. The first block will be closed if the number of proposals received that meet the condition reaches, or exceeds, its number of places.

If in the first offer the first block has been closed, the control computing device 100 provides a second offer, on a second date, for a second block, indicating information about the number of places available in the second block, a recommended price, and a period of time in which said second offer is valid. Next, the control computing device 100 will recheck if the proposals received for this second offer are greater than or equal to the minimum price, repeating the steps described above. The bidding process is repeated for all the blocks that are part of the first section or until the event takes place. The same is done for the rest of the sections of the site.

Alternatively or additionally, if the first block has not been closed, the second offer may still include places for the first block.

In the previous example of the segmentation of the section/sections by blocks, the allocation of places can also be carried out taking into account the different criteria described above. In an exemplary embodiment, said extension of the first block, and hence the rest of the blocks, can be carried out as follows. Having defined the block within its parameters, some of the variables that define it may have "fluid" states. Thus, for each block containing at least opening date, closing date, zone/section, starting price and an exit capacity (that is, number of places in the block), a volume control function is established. The volume control function has variables to be configured: maximum overflow, opening volume, flow and calculation variables: proposals per minute, current date and closing date.

The maximum overflow is the limit number of places that will be allowed to enter in a block above the predetermined capacity at its opening. The opening volume is the number of proposals from which the introduction of additional capacity in the block will be allowed. The flow rate is the number of locations per minute that will be allowed to enter in said block and responds to a calculation that starts when the opening volume has been reached and that needs proposals per minute and closing date for its calculation. Thus, in a situation where the opening volume has been cleared, proposals per minute multiplied by closing date minus current date, and divided by maximum overflow will give new places/locations per minute or the number of locations to be introduced in the block to each minute. Therefore, every minute the following is calculated:

$$Pn > VA \Longrightarrow NLpm = Ppm(fc - fa) \Leftrightarrow D\max > Ppm - (fc - fa) \ \&$$

$$NLpm = \frac{D\max}{(Fc - Fa)} \Leftrightarrow D\max < Ppm - (fc - fa) \ \&$$

$$\|Bc\| = Ba + NL,$$

where:
Pn=Number of existing proposals
Ppm=Proposals per minute
VA=Opening Volume Dmax=Maximum overflow
NLpm=new locations per minute
Ba=Block capacity in opening
Bc=Block capacity in closing
fc−fa=closing date-current date (in minutes)
NL=New access rights added in the block.

In an exemplary embodiment, a control factor is also provided to avoid fluctuations or instabilities in the allocation of access rights. In this case, all proposals received that come into computation for the average price must be included within a certain threshold. There may be a minimum price threshold and/or a maximum price threshold, for example +/−30% of the average price, among others. Proposals received that are outside this threshold will receive a depreciation/appreciation of a variable rate proportional to the distance from the threshold.

$$\forall P_\neg \in PV \Leftrightarrow P_n \leq pm + (pm\,r) \wedge P_n \geq pm - (pm\,r)$$

$$P = PVa \Leftrightarrow P > pm + (pm\,r)$$

$$P = PVd \Leftrightarrow P < pm - (pm\,r)$$

$$PVa = \frac{(pm + (pm\,r)) - P}{d} + P$$

$$PVd = \frac{(pm - (pm\,r)) - P}{d} + P,$$

where,
P=Proposal
r=range in %
d=integer <1 for modification of appreciation/depreciation
PV=Proposal to be modified with appreciation/depreciation
PVa−PVd=Proposal to be modified with appreciation/depreciation For example, according to a particular embodiment, a proposal that is 10% above the threshold r=30% and with an integer d=2 will receive a depreciation or de-merit of the half, calculated on the average price. A proposal that is 20% below the threshold r=−30% will receive an appreciation or re-merit of 10%.

In the present invention, all offers provided by the control computing device 100 have a specific closing date (i.e. the period of time in which the offer is valid), which is known by all the agents involved. However, in an exemplary embodiment, said closing date, in situations in which there are still available places, i.e. noSoldOut, can be extended by intervals of a certain time, for example of 10 minutes, up to a maximum time, for example 2 hours, in case a proposal has been received close to the closing date, for example in the last 10-15 minutes or in the last 30 minutes. Otherwise, the offer closes on the aforementioned closing date.

Also, to eradicate the manipulation of the results of a purchase of places by any agent, be it the secondary resale market, a hacker or the same promoter or event agency, in an exemplary embodiment, in the present invention, the proposals received from the potential users/attendees through the computing terminals $10_1$, $10_2$, $10_3$ ... $10_n$ are encrypted with a private user key U.private.key, together with its public key U.public.key. Thus, the identity of the user is certified. The control computing device 100 when receiving the proposals, notes its value and date in the database 101.

Each proposal may contain the fields User, Date, Value, U.public.key and Data.

When the stipulated date is met and the offer closes, the control computing device 100, according to its different computer systems, calculates the successful proposals (i.e. those that meet the aforementioned condition) and discards the unsuccessful ones, orders the results and generates a database of failures and a block of successful proposals. With the successful proposals, it orders them by date and generates public and private keys by means of a hash of the total of the database of the offer with the successful results or block B.public.key and B.private.key.

In yet another embodiment, the control computing device 100 generates or orders to generate the ticket of the successful proposals. For this, the control computing device 100 collects the successful proposals of the database User+Date+Value+U.public.key+Data encrypted with the U.public.key and adds the same combination encrypted with B.public.key. Likewise, the control computing device 100 also adds to this data the section and seat identification (if applicable), without encrypting.

The ticket is as follows:

T=(User+Date+Value+BlockId+B.public.key+Data)
U.public.key+(User+Date+Value+BlockId+U.public.key+Data)B.public.key+(IdBlock+IdSeat)

In the process of ticket authentication, the user can decrypt the first part of the ticket using U.private.key to receive the original value, date and offer that certifies the validity of the ticket together with the public key of the offer. In the case of the event authenticator, he uses B.private.key to decrypt the second part of the ticket and receive value, date, user, original offer and U.public.key, certifying the user's identity.

Furthermore, in the particular case of the segmentation of sections by blocks, the blocks, when closed, can be encrypted, for example with a hash function, among others. This ensures the non-manipulation of blocks with accepted proposals.

To avoid the possibility of making copies of QR codes with "screenshots" in the mobile application or APP, the present invention also provides a parallel application that synchronizes a set of colors in the parts of the screen not occupied by the QR code. For example, by establishing a list of 50 colors, in random order, by their hexadecimal code (#FFFFFF), in an infinite loop, which change synchronously every certain period of time by means of a fade. As a result, access control personnel only need to look at the general color of all the devices that are going through to know if a device is synchronous or is a copy.

The proposed invention can be implemented in hardware, software, firmware or any combination thereof. If implemented in software, the functions can be stored in or encoded as one or more instructions or code in a computer-readable means.

The computer-readable medium includes computer storage means. The storage means can be any available means that can be accessed by a computer. By way of example, and not limitation, such a computer readable means may comprise RAM, ROM, EEPROM, CD-ROM or other optical disk storage, magnetic disk storage or other magnetic storage devices, or any other means that can be used to carry or store desired program code in the form of instructions or data structures and which can be accessed by a computer. Disk (disk) and disk (disc), as used in this document, include compact discs (CD), laser disc, optical disc, digital versatile disk (DVD), floppy disk and Blu-ray disc where discs (disks) normally reproduce data in magnetic form, while discs (discs) reproduce data optically with lasers. Combinations of the above should also be included within the scope of computer-readable means. Any processor and storage means can reside in an ASIC. The ASIC can reside in a user terminal. As an alternative, the processor and the storage means may reside as discrete components in a user terminal.

As used herein, computer program products that comprise computer-readable means include all forms of computer-readable means except, to the extent that means is considered to be non-established transient propagation signals.

A person skilled in the art could introduce changes and modifications in the described embodiments without departing from the scope of the invention as defined in the appended claims.

The invention claimed is:

1. A method for control and allocation of access rights with variable price, wherein a control computing device is used, which includes or has access to a database with information associated with a site comprising one or several sections, each of them with a certain number of places, the method comprising:
    a) providing, by said control computing device, to a bidirectional interface accessible by potential users through computing terminals, on a first date, a first offer for an access right for a number of places in at least a first section of said site, including information on the number of places available for said first section, for said first offer, a recommended price and a period of time in which said first offer is valid, wherein the number of places offered in the first offer is less than a total capacity of the site;
    b) receiving, by said control computer device, through said interface, from said computing terminals of the potential users, and during said period of time, a certain number of proposals with different prices in relation to said first offer, wherein the proposals received from each of the potential users are encrypted by a unique user identifier with a private key and a public key;
    c) verifying, by the control computing device, that the proposals received from said computing terminals meet the condition of being greater than or equal to a certain minimum price and:
        c1) applying a criterion of allocation of places to those proposals received that meet said condition, and indicating, through said interface, to the computing terminals of the potential users in which their proposal does not meet said condition, that the same is not acceptable, but that said potential users are allowed to send another proposal; and
        c2) after the number of proposals received that meet said condition reaches or exceeds the number of places in said first offer, the control computing device automatically expands the number of places in the first section to accommodate the total number of proposals received that meet the condition, said expansion being carried out gradually taking into consideration a rate of reception of the proposals, and, after the first section has no more availability, assigns the proposals to at least a second section;
    d) providing, by said control computing device to the bidirectional interface accessible by the potential users through said computing terminals, at the end of said period of the first offer, on a second date, at least one second offer for an access right in said at least one first section, including information on the number of places that remain available for said first section, in this second offer, a recommended price, an average closing price of the first offer and a period of time in which said second offer is valid; and
    e) repeating steps b) and c) for said second offer and in relation to said second date, in case there are still places available in said first section, continuing providing other consecutive offers on other dates, for said first section performing steps b) and c) until the number of places for said first section is sold-out, so that a final price assigned to each potential user reflects a variable maximum price that said potential users are willing to propose,
    f) configuring a screen of each computing terminal to display an allocated access right and a set of colors in a part of the screen not occupied by the allocated access right, wherein the allocated access right is configured as a QR code; and
    g) synchronizing the set of colors of all computing terminals by means of a parallel application, wherein the screen of each computing terminal of all computing terminals displays a color of the set of colors, every certain period of time, synchronously with a screen of any other computing terminal of all computing terminals, so that the colors of screens of all computing terminals are synchronized.

2. The method according to claim 1, wherein steps a) to c) are performed for a plurality of sections.

3. The method according to claim 2, wherein, in each section of said plurality of sections, the minimum price is different.

4. The method according to claim 1, wherein, in step c), when the number of proposals received that meet the condition exceeds the number of places in the first offer, the control computing device automatically:
    expands the number of places in the first section to accommodate the total number of proposals received that meet the condition, and, if the first section has no more availability, assigns the proposals to at least a second section.

5. The method according to claim 1, wherein the first section is divided into a certain number of blocks, each block having assigned a certain number of places, and wherein the method comprises:
    in said step a), providing on said first date, the first offer for a first block of said determined number of blocks, including information about the number of places available in the first block, a recommended price, and a period of time in the which said first offer for the first block is valid;
    in step b) receiving, during said period of time, a certain number of proposals with different prices in relation to said first offer for said first block;
    in said step c):
    applying the criteria for seat allocation to the proposals received that meet the condition and indicate to the users whose proposals do not meet the condition, that its proposals are rejected, but that they can send another proposal, for the first block if it is not closed or for another block; and
    in the event that the number of proposals received meeting the condition exceeds the number of places in the first offer, the control computing device automatically expands the number of places in the first block until accommodating the total number of proposals received that fulfill the condition, wherein said expansion is carried out gradually taking into consideration a rate of reception of the proposals, wherein if the first section does not have more availability the control computing device allocates the proposals to at least a second block, so that a dynamic modification of the capacity of the blocks is performed based on the proposals received, wherein the first block is closed if the number of proposals received that meet the condition reaches, or exceeds, its number of places; and in step d), providing on said second date, the second offer for said first block if it is not closed or for at least a second block of said determined number of blocks.

6. The method according to claim 1, wherein the criterion for assigning places is selected from one of:
priority for those proposals according to their order of reception;
priority for those proposals that have a higher value;
priority for those proposals that are above an average value of all proposals received;
assignment of a certain number of places at a price that exceeds the minimum price of the offer by a predetermined magnitude; or
priority for those proposals that form a group.

7. The method according to claim 1, wherein the number of places offered in each offer is the same or different.

8. The method according to claim 1, wherein the recommended price of the different offers is the same or different.

9. The method according to claim 1, further comprising extending the period of time in which said first offer is valid and/or the period of time in which said second offer is valid for a certain time, until a maximum time, in case of having received a proposal in the 10-15 minutes before the end of said period of time.

10. The method according to claim 1, wherein the method in step c) further comprises:
verifying that the proposals received are greater than a minimum price threshold and/or less than a maximum price threshold, and
applying to those proposals below the minimum price threshold an appreciation that automatically increases the proposal by a certain percentage or applying to those proposals above the maximum price threshold a depreciation that automatically reduces the proposal by a certain percentage.

11. The method according to claim 1, wherein the access rights comprise tickets for an event that includes a concert, a theatrical performance or a sporting event, hotel/hostel rooms or tickets for modes of transport including airplane and train.

12. A system for control and allocation of access rights with variable price, the system comprising:
a control computing device that includes one or more processors and at least one memory; and
a database with information associated with a site comprising one or several sections, each of them with a determined number of places and each of the sections including a plurality of places, wherein the control computing device is adapted and configured to access the database and wherein said one or more processors are adapted and configured to:
a) provide to a bidirectional interface accessible by potential users, on a first date, a first offer for an access right for a number of places for at least a first section of said site, including information about the number of places available for said first section, for said first offer, a recommended price, and a period of time in which said first offer is valid, the number of places offered in the first offer being less than a total capacity of the site;
b) receive, through said interface, from computing terminals of said potential users, and during said period of time, a certain number of proposals with different prices in relation to said first offer, wherein the proposals received from each of the potential users are encrypted by a unique user identifier with a private key and a public key;
c) verify that the proposals received from said computing terminals meet the condition of being greater than or equal to a certain minimum price and:
c1) apply a criterion of allocation of places to those proposals received that meet said condition, and indicate, through said interface, to said computing terminals of potential users in which their proposal does not meet said condition, that the same is not acceptable, but that said potential users are allowed to send another proposal; and
c2) after the number of proposals received that meet said condition reaches or exceeds the number of places in said first offer, automatically expand the number of places in the first section to accommodate the total number of proposals received that meet the condition, said expansion being carried out gradually taking into consideration a rate of reception of the proposals, and, after the first section has no more availability, assign the proposals to at least a second section;
d) provide, to the bidirectional interface accessible by the potential users through said computing terminals, upon completion of said period of the first offer, on a second date, at least a second offer for an access right for said at least one first section, including information about the number of places that remain available for said first section, in this second offer, a recommended price, an average closing price of the first offer and a period of time in which said second offer is valid;
e) repeat steps b) and c) for said second offer, in relation to said second date, and in case there are still available places in said first section continue providing other consecutive offers on other dates, for said first section performing steps b) and c) until the number of places for said first section is sold-out,
so that a final price assigned to each potential user reflects a variable maximum price that said potential users are willing to propose,
f) configure a screen of each computing terminal to display an allocated access right and a set of colors in a part of the screen not occupied by the allocated access right, wherein the allocated access right is configured as a QR code; and
g) synchronize the set of colors of all computing terminals by means of a parallel application, wherein the screen of each computing terminal of all computing terminals displays a color of the set of colors, every certain period of time, synchronously with a screen of any other computing terminal of all computing terminals, so that the colors of screens of all computing terminals are synchronized.

13. The system according to claim 12, wherein said one or more processors are further adapted and configured to perform steps a) to c) for a plurality of sections.

14. The system according to claim 13, wherein, in each section of said plurality of sections, the minimum price is different.

15. The system according to claim 12, wherein said one or more processors are further adapted and configured to offer in each offer an equal or different number of places.

16. The system according to claim 12, wherein said one or more processors are further adapted and configured to indicate in the different offers an equal or different recommended price.

17. The system according to claim 12, wherein the first section is divided into a certain number of blocks, wherein each block has a number of places assigned.

18. A computer program product comprising non-transient computer executable instructions, the instructions being executed on a computing device, said computing device being able to perform the steps of the method according to claim 1.

* * * * *